Patented Nov. 20, 1934

1,981,822

UNITED STATES PATENT OFFICE 1,981,822

RUBBER VULCANIZATION ASSISTANT

Arthur W. Burwell, Niagara Falls, N. Y., assignor to Alox Chemical Corporation, New York, N. Y., a corporation of New York No Drawing. Application December 9, 1930, Serial No. 501,167

11 Claims. (Cl. 18—53)

This invention relates to the art of vulcanizing rubber compositions, particularly those compositions containing sulfur and zinc oxide, with the aid of an organic accelerator of rubber vulcanization, and resides in the provision of an agent for and method of activating the accelerator content of such compositions.

It is known that rubbers respond with unequal results to vulcanization by the heat-and-pressure process, which inequality of results is accentuated rather than diminished by the use of the so-called accelerating agents, and it is generally believed that these unequal results are determined at least in part by the variation in content in the particular specimen of rubber of naturally-occurring fatty acids. Whatever may be the correct explanation therefor, it is known that the addition of stearic acid in pre-determined minor proportions to rubber mixes containing sulfur, zinc oxide and an organic accelerating agent (and particularly those agents of the group consisting of the xanthates, mercaptobenzothiazoles, p-nitrosodimethyl aniline, hexamethylene tetramine and, perhaps to a lesser extent, the guanidines and ethylidine anilines), expedites the compounding of the mix, improves or lends different characteristics to the resulting vulcanized rubber, and aids in the standardization of the conditions of vulcanization whereby to obtain vulcanized rubber products of pre-determined characteristics. Stearic acid thus has come to be known to the art as an "activator" of the vulcanization accelerating agent.

I have found that new and improved effects both in the operations of compounding and in the resulting vulcanized rubber products are obtainable by adding to rubber mixes containing sulfur, zinc oxide and organic vulcanization accelerating agents of the type above described, mixtures consisting essentially of water-insoluble saturated monocarboxylic acids, soluble in petroleum hydrocarbons and preferably of petroleum origin, and preferably (although not necessarily) having a range of carbon atoms in the molecule of from four to twelve and an average molecular weight of from 160 to 165. The acids contained in such mixtures may have the constitution of straight,—or branched,—chain aliphatic acid compounds, or of the so called naphthenic acid compounds which latter may be separated in known manner from certain petroleum oils.

Acid mixtures of the above-described type may be obtained by a process which consists generally in the controlled, partial, oxidation of mixtures of petroleum hydrocarbons, including petroleum waxes and petroleum distillates both light and heavy, by contacting the petroleum hydrocarbon mixture, in liquid phase, in the presence of an exciter of oxidation, with an oxidizing gas such as air or oxygen-enriched air, at a reacting temperature above normal room temperature but not above 175° C., and at a superatmospheric pressure of from 150 to 350 pounds per square inch, under such conditions, including time, as to yield an optimum content of the above-described acids while limiting the formation of oxidized compounds insoluble in the partially oxidized mass and in petroleum hydrocarbons, and the isolation of the aforesaid petroleum-soluble acids from the resulting partially oxidized mass. I have found that these mixtures of acidic compounds, pound for pound, exhibit a greater "activating" effect in vulcanization than does stearic acid of commerce, so that the time of the resulting "cure" may be reduced materially; and that the resulting rubber products have high elastic limits, have a better modulus, and generally are of better wearing qualities, than similar rubber articles in which stearic acid has been used. I have found also that by the use of relatively very small amounts of the said mixtures of acidic compounds in compounding rubber mixes I am able to secure the almost immediate solution in rubber of zinc oxide in any practical proportion, and that the components of the mixes blend more readily during the working of the same on the rubber mill than is the case when using stearic acid as the "activator".

A preferred mixture of acidic compounds for use in carrying into effect the present invention is the product obtained by carrying out the following process:

A body of commercially available petroleum distillate (whether or not refined as to odor and/or color), having a specific gravity of 45° Baumé and known generally as "kerosene" to which has been added a suitable amount of a known oxidation catalyst, such as an organic salt of manganese, say, manganese oleate, e. g., 0.1% by weight, or of a non-acidic partial oxidation product, rich in ketonic compounds, obtained as a by-product in a like oxidation procedure, or of both, is subjected to oxidation treatment at a temperature of 140° C. and at a pressure of 200 pounds per square inch by blowing therethrough a stream of air, and the oxidation treatment is continued until incipient separation of products insoluble in the reaction mass is indicated in a test sample of the mass.

From the resulting reaction mixture, which contains a great number of different oxidation products of petroleum hydrocarbons both acidic and non-acidic the desired acids must be separated, in that a 15% to 25% content in the "activator" of unsaponifiable compounds (e. g., non-acidic ketonic compounds) has a pronounced softening effect upon rubber. My preferred method of separation is as follows:

The whole reaction mixture preferably is distilled at a temperature up to 280° C., thus obtaining a residue of shellac-like bodies amounting to from 5 to 15% of the total distilland and an acid distillate containing, among other compounds, acids having an average molecular weight of from 160 to 165. The above distillation may be carried to 300° C. if desired, whereupon harder shellac-like bodies are produced in the residue. My usual procedure for a dry distillation is to distill from the beginning temperature, which may be anywhere from 75° up to the boiling point of water, to about 280° C. When distilling by the aid of direct steam, however, the temperatures are somewhat lower, although larger amounts of material of good color go over and considerably smaller amounts of shellac-like bodies are left behind in the still. Vacuum distillation gives an even higher yield and safeguards against cracking.

The said acid distillate, or if desired, the whole reaction mixture without distillation, is then subjected to saponification by treatment with an aqueous solution of an alkali (e. g., caustic soda) in a suitable amount to ensure completion, thus obtaining a supernatant oily layer containing unoxidized hydrocarbons and hydrocarbons which have been oxidized insufficiently to have been converted into acids (e. g., alcoholic and ketonic compounds) but substantially no acidic compounds, and a subnatant aqueous layer containing soaps of the desired acids together with some ketonic compounds which tenaciously associate with the said acids and their soaps; the oily layer is carefully drawn off. To the aqueous layer there is added with thorough admixture a substantial amount of a solvent for the ketonic compounds which solvent is immiscible with water, such as, for example, kerosene (preferably that amount which, with the returned non-acidic partially oxidized portions of the batch, will constitute another full batch of the starting material) and the mixture is allowed to settle, yielding a subnatant aqueous soap layer and an oily supernatant layer containing at least the major portion of the ketonic compounds which had, in the preceding saponification step, persisted in association with the soaps. By this operation the ketonic compound content of the soap composition is reduced to from about 4 to not more than 12 per cent.

It is possible to reduce the amount of dissolved ketonic bodies still more by boiling the soap solution (which should be only very slightly alkaline) for a time, thus volatilizing a portion of such ketonic bodies which, unlike the acids, are not combined with alkali and thus rendered non-volatile. Apparently these bodies, though of high boiling point, are somewhat volatile with steam and thus the amount retained in the soap solution is reduced considerably. The resulting soap solution, after careful clarification from the immiscible solvent mixture, is then acidified with an amount of an acid, say, a mineral acid such as sulfuric acid, sufficient to decompose the soaps, whereupon the desired acids are precipitated, in admixture, from the resulting acidic aqueous solution of sodium sulfate. Precautions are taken to keep the volume of solution as low as possible, and to use returned waters from previous precipitations (from which the sodium sulfate has been crystallized), for the purpose of preventing as far as possible solution of the desired acids in the acidic aqueous solution, which latter usually contains some of the acids acetic, propionic, butyric, valeric (produced in minor amounts in the oxidation step hereinbefore described), which acids have a strong solvent effect upon the desired acids and particularly upon the lower molecular weight acids of the mixture. The mixture of acids precipitated from the aqueous solution is separated therefrom, and is dried in any suitable manner as by distillation in an aluminum still, after which it is in a form for immediate use. I obtain about 50 pounds of the mixed acids from a one hundred pound charge of kerosene.

It has been stated, in the foregoing, that the oxidation treatment should be continued only until incipient separation of acidic compounds insoluble in the reaction mixture and in petroleum hydrocarbons is indicated in a test sample. This precaution is an economic one only, since it is a fact that the process is operable in the case of protraction of the oxidation step beyond the point above described: in such case, the petroleum-insoluble acidic oxidation products may be separated from the reaction mass in known manner, as by settling and decantation, or an equivalent procedure, and the process continued as described. It will then be found that the same desired acidic bodies are recoverable from the reaction mixture but in somewhat lower yield. As will be apparent, it is not essential, but only expedient, to protract the oxidation step to that point at which incipient separation of insoluble acidic compounds occurs, since the desired acidic compounds begin to form materially before the formation of the said insoluble acidic compounds and are present (but in lesser amounts) in a reaction mixture produced by a briefer oxidation than that above described by way of example.

The mixture of the acids may be added, as such, to the rubber on the mill, or it may be added to the rubber in the form of a mixture of the zinc salts of the acids or admixed with an excess of zinc oxide.

It is to be understood that the invention does not exclude the further separation of the aforesaid mixture of acids into its individual members, or into more narrow fractions of the mixture (as, for example, by careful fractional distillation or like procedure), and the use of such individual members or narrow fractions instead of the aforesaid mixture of acids. Furthermore, any of the acids obtained by the practicing of the above-described process and ranging in molecular weights from the molecular weight of valeric acid upwardly to and including the relatively very high molecular weight acids are useful as activators of rubber vulvanization accelerators.

The following example illustrates the use of the above-described mixture of acids in a rubber mix:

| | Parts by weight |
|---|---|
| Pale crepe rubber | 100 |
| Carbon black | 40 |
| Sulfur | 3 |
| Zinc oxide | 5 |
| Commercial mercapto-benzol-thiazol ("Captax") | 1 |
| And the hereinbefore described mixture of acids | 2 |

I claim:

1. As a new composition of matter, a mixture adapted to be vulcanized by the heat and pressure method and comprising rubber, sulfur, zinc oxide, an organic accelerator of vulcanization and a mixture consisting essentially of water-insoluble, petroleum-soluble, saturated monocarboxylic acids, of petroleum origin.

2. As a new composition of matter, a mixture adapted to be vulcanized by the heat and pressure method and comprising rubber, sulfur, zinc oxide, an organic accelerator of vulcanization and a mixture consisting essentially of water-insoluble, petroleum-soluble, saturated monocarboxylic acids, of petroleum origin, which latter mixture contains not more than 12 per cent by weight of non-acidic petroleum oxidation products.

3. As a new composition of matter, a mixture adapted to be vulcanized by the heat and pressure method and comprising rubber, sulfur, zinc oxide, an organic accelerator of vulcanization and a mixture consisting essentially of water-insoluble, petroleum-soluble, saturated monocarboxylic acids, having a range of carbon atoms in the molecule of from 4 to 12 and an average molecular weight of from 160 to 165.

4. As a new composition of matter, a mixture adapted to be vulcanized by the heat and pressure method and comprising rubber, sulfur, zinc oxide, an organic accelerator of vulcanization and a mixture consisting essentially of water-insoluble, petroleum-soluble, saturated monocarboxylic acids, of petroleum origin, having a range of carbon atoms in the molecule of from 4 to 12 and an average molecular weight of from 160 to 165.

5. As a new composition of matter, a mixture adapted to be vulcanized by the heat and pressure method and comprising rubber, sulfur, zinc oxide, an organic accelerator of vulcanization and a mixture consisting essentially of water-insoluble, petroleum-soluble, saturated monocarboxylic acids, of petroleum origin, having a range of carbon atoms in the molecule of from 4 to 12 and an average molecular weight of from 160 to 165, which latter mixture contains not more than 12 per cent by weight of non-acidic petroleum oxidation products.

6. Method of vulcanizing rubber which comprises admixing with rubber zinc oxide, a vulcanizing agent, an organic accelerator of vulcanization and an activator consisting essentially of water-insoluble, petroleum-soluble, saturated monocarboxylic acids, of petroleum origin, and subjecting the resulting mixture to vulcanizing conditions.

7. Method of vulcanizing rubber which comprises admixing with rubber zinc oxide, a vulcanizing agent, an organic accelerator of vulcanization and an activator consisting essentially of water-insoluble, petroleum-soluble, saturated monocarboxylic acids, of petroleum origin, which latter mixture contains not more than 12 per cent by weight of non-acidic petroleum oxidation products, and subjecting the resulting mixture to vulcanizing conditions.

8. Method of vulcanizing rubber which comprises admixing with rubber zinc oxide, a vulcanizing agent, an organic accelerator of vulcanization and an activator consisting essentially of water-insoluble, petroleum-soluble, saturated monocarboxylic acids, having a range of carbon atoms in the molecule of from 4 to 12 and an average molecular weight of from 160 to 165, and subjecting the resulting mixture to vulcanizing conditions.

9. Method of vulcanizing rubber which comprises admixing with rubber zinc oxide, a vulcanizing agent, an organic accelerator of vulcanization and an activator consisting essentially of water-insoluble, petroleum-soluble, saturated monocarboxylic acids, of petroleum origin, having a range of carbon atoms in the molecule of from 4 to 12 and an average molecular weight of from 160 to 165, and subjecting the resulting mixture to vulcanizing conditions.

10. Method of vulcanizing rubber which comprises admixing with rubber zinc oxide, a vulcanizing agent, an organic accelerator of vulcanization and an activator consisting essentially of water-insoluble, petroleum-soluble, saturated monocarboxylic acids, of petroleum origin, having a range of carbon atoms in the molecule of from 4 to 12 and an average molecular weight of from 160 to 165, which latter mixture contains not more than 12 per cent by weight of non-acidic petroleum oxidation products, and subjecting the resulting mixture to vulcanizing conditions.

11. As a new composition of matter, a mixture adapted to be vulcanized by the heat and pressure method and comprising rubber, sulfur, zinc oxide, mercaptobenzothiazole and a mixture consisting essentially of water-insoluble, petroleum-soluble, saturated monocarboxylic acids, of petroleum origin.

ARTHUR W. BURWELL.